US012639024B2

(12) United States Patent
Fan et al.

(10) Patent No.: US 12,639,024 B2
(45) Date of Patent: May 26, 2026

(54) METHOD FOR COMMUNICATIVELY CONNECTING TO DISPLAY APPARATUS, MOBILE APPARATUS AND AUTOMATIC COMMUNICATIVE CONNECTION SYSTEM

(71) Applicant: Optoma Corporation, New Taipei City (TW)

(72) Inventors: Kang-Lun Fan, New Taipei City (TW); Lu-Heng Wu, New Taipei City (TW)

(73) Assignee: Optoma Corporation, New Taipei City (TW)

( * ) Notice: Subject to any disclaimer, the term of this patent is extended or adjusted under 35 U.S.C. 154(b) by 91 days.

(21) Appl. No.: 18/673,234

(22) Filed: May 23, 2024

(65) Prior Publication Data

US 2024/0402976 A1 Dec. 5, 2024

(30) Foreign Application Priority Data

Jun. 2, 2023 (TW) ................................. 112120641

(51) Int. Cl.
G06F 3/14 (2006.01)
G01S 5/00 (2006.01)
(52) U.S. Cl.
CPC .......... G06F 3/1454 (2013.01); G01S 5/0063 (2013.01); *G09G 2370/16* (2013.01)
(58) Field of Classification Search
None
See application file for complete search history.

(56) References Cited

U.S. PATENT DOCUMENTS 8,504,842 B1    8/2013  Meacham
8,519,889 B2 *  8/2013  Steer ........................ G01S 1/14
                                                    342/398

(Continued)

FOREIGN PATENT DOCUMENTS

CN          107113468       8/2017
CN          104270668       3/2018

(Continued)

OTHER PUBLICATIONS

"Office Action of Taiwan Related Application, Application No. 113135988", issued on Mar. 28, 2025, p.1-p.8.

(Continued)

*Primary Examiner* — K. Wong
(74) *Attorney, Agent, or Firm* — JCIPRNET

(57) ABSTRACT

A method for communicatively connecting to a selected display apparatus, a mobile apparatus, and an automatic communicative connection system are disclosed. The mobile apparatus drives a positioning chip to scan with multiple signal emission angles within a preset range. When a single display apparatus is scanned within the preset range, the mobile apparatus selects the single display apparatus as the selected display apparatus. When multiple display apparatuses are scanned within the preset range, the mobile apparatus selects one of the display apparatuses as the selected display apparatus according to multiple corresponding distances respectively between the display apparatuses and the mobile apparatus as well as the signal emission angles corresponding to the display apparatuses with the mobile apparatus. After the selected display apparatus is determined, the mobile apparatus is communicatively connected with the selected display apparatus.

20 Claims, 6 Drawing Sheets

(56) References Cited

U.S. PATENT DOCUMENTS

| | | | |
|---|---|---|---|
| 8,847,903 B2 | 9/2014 | Stokes et al. | |
| 9,372,978 B2 | 6/2016 | Dellinger et al. | |
| 9,538,444 B2 * | 1/2017 | Kuwabara | H04W 36/22 |
| 10,833,402 B2 * | 11/2020 | Khushrushahi | H01Q 15/002 |
| 2015/0047020 A1 | 2/2015 | Kim et al. | |
| 2016/0300547 A1 | 10/2016 | El-Rukby et al. | |
| 2017/0076077 A1 | 3/2017 | Zhao et al. | |
| 2019/0132815 A1 | 5/2019 | Zampini, II et al. | |
| 2022/0397634 A1 * | 12/2022 | Hu | G01S 5/02 |

FOREIGN PATENT DOCUMENTS

| | | | | |
|---|---|---|---|---|
| CN | 108700997 | | 10/2018 | |
| CN | 111754656 | | 10/2020 | |
| CN | 112241557 | | 1/2021 | |
| CN | 112306614 | | 2/2021 | |
| CN | 114065151 | | 2/2022 | |
| CN | 118200842 | | 6/2024 | |
| KR | 20250089233 A | * | 6/2025 | G06F 3/14 |
| TW | 201616878 | | 5/2016 | |
| TW | 202147884 | | 12/2021 | |
| TW | 202207747 | | 2/2022 | |
| TW | 202311960 | | 3/2023 | |
| TW | 202343024 | | 11/2023 | |
| TW | 202406772 | | 2/2024 | |
| TW | 1891513 | | 7/2025 | |
| WO | WO-2016028093 A2 | * | 2/2016 | H04W 52/04 |

OTHER PUBLICATIONS

Jerry Lu, "Is BLE Beacon the optimal indoor positioning solution?", CTIMES, Feb. 2022, available at: https://www.ctimes.com.tw/aboutus-tw.asp.

"Office Action of Taiwan Counterpart Application", issued on Aug. 6, 2024, p. 1-p. 4.

* cited by examiner

S405 — based on an initial angle as the signal emission angle

S410 — emit an apparatus search signal adjust the signal emission angle
S430

S415 — whether the response signal is received yes no record apparatus information and positioning information
S420

S425 — whether it exceeds 360 degrees no yes

S435 — the apparatus information has been collected

A

METHOD FOR COMMUNICATIVELY CONNECTING TO DISPLAY APPARATUS, MOBILE APPARATUS AND AUTOMATIC COMMUNICATIVE CONNECTION SYSTEM

CROSS-REFERENCE TO RELATED APPLICATION

This application claims the priority benefit of Taiwan application serial no. 112120641, filed on Jun. 2, 2023. The entirety of the above-mentioned patent application is hereby incorporated by reference herein and made a part of this specification.

BACKGROUND

Technical Field

This disclosure relates to a wireless connection technology, in particular to a method for communicatively connecting a display apparatus and a mobile apparatus. A communicative connection system includes the display apparatus and the mobile apparatus.

Description of Related Art

Conventional mobile apparatus (e.g., laptop, computers, tablets, smartphones, etc.) and display apparatus can be connected through a network for collaborative and interactive applications. For example, after the mobile apparatus is wireless connected to the display apparatus, the display apparatus can share content or wireless project images, etc. When one or more mobile apparatuses enter a field with multiple display apparatuses (e.g., projectors, Interactive Flat Panel (IFP) displays, touch displays, etc.), especially when multiple users encounter a grouping session in a meeting room or classroom, each user's mobile apparatus needs to be connected to one of the multiple display apparatuses used in the grouping. The current connection function of mobile apparatuses is prone to misjudgment, resulting in the need to manually adjust the connection of mobile apparatuses to the correct display apparatus. In addition, if the connection is assigned manually or with other software, it requires complicated steps and time to complete the grouping connection.

The information disclosed in this Background section is only for enhancement of understanding of the background of the described technology and therefore it may contain information that does not form the prior art that is already known to a person of ordinary skill in the art. Furthermore, the information disclosed in the Background section does not mean that one or more problems to be resolved by one or more embodiments of the disclosure was acknowledged by a person of ordinary skill in the art.

SUMMARY

Other purposes and advantages of the disclosure can be further understood from the technical characteristics disclosed in the disclosure.

In order to achieve one or part or all of the above purposes or other purposes, the disclosure provides a method for communicatively connecting to a selected display apparatus, a mobile apparatus, and an automatic communicative connection system, which may be automatically grouped so that the mobile apparatus may be communicatively connected to the most suitable display apparatus.

The method for communicatively connecting to the selected display apparatus of the disclosure is performed by a processor of the mobile apparatus, and the method includes the following. A positioning chip of the mobile apparatus is driven to scan with multiple signal emission angles within a preset range. When a single display apparatus is scanned within the preset range, the single display apparatus is selected as the selected display apparatus. When multiple display apparatuses are scanned within the preset range, one of the display apparatuses is selected as the selected display apparatus according to multiple corresponding distances respectively between the display apparatuses and the mobile apparatus as well as multiple of the signal emission angles corresponding to the display apparatuses with the mobile apparatus. The mobile apparatus is communicatively connected with the selected display apparatus In an embodiment of the disclosure, the step of driving the positioning chip of the mobile apparatus to scan with the signal emission angles within the preset range includes the following. After starting to scan at an initial angle of the signal emission angles by the positioning chip, sequentially adjusting to scan with multiple other angles of the signal emission angles. The positioning chip emits multiple apparatus search signals based on the signal emission angles. In response to the positioning chip receiving a response signal from the display apparatus, the response signal is transmitted to the processor to obtain apparatus information and positioning information corresponding to each of the display apparatuses. Each of the response signal corresponds to one apparatus search signal.

In an embodiment of the disclosure, the method further includes the following. The processor determines whether a scan within the preset range is completed. If the scan within the preset range is completed, that the apparatus information within the preset range is collected. If the scan within the preset range is not completed, the positioning chip is driven to continue scanning until the positioning chip completes the scan with all the signal emission angles.

In an embodiment of the disclosure, the apparatus information includes at least one of an apparatus name, an Internet Protocol (IP) address, a service set identifier, and a network setting. The network setting is used to indicate that the display apparatus transmitting the response signal is in an access point (AP) mode or a station mode. The positioning information includes the corresponding distance between each of the display apparatus and the mobile apparatus and the corresponding signal emission angle corresponding to the each of the display apparatus with the mobile apparatus.

In an embodiment of the disclosure, the in response to the positioning chip receiving a response signal from the display apparatus further includes the following. If a storage of the mobile apparatus has not stored the apparatus name of any one of the display apparatuses, the processor adds the apparatus information and the positioning information corresponding to the apparatus name. If the storage of the mobile apparatus has stored the apparatus name, the processor overwrites the apparatus information and the positioning information corresponding to the apparatus name.

In an embodiment of the disclosure, the method further includes the following. When the display apparatuses are scanned within the preset range, a minimum distance is obtained from the corresponding distance between the display apparatuses and the mobile apparatus. In response to the minimum distance corresponding to the multiple of the display apparatuses, among the signal emission angles corresponding to the display apparatuses corresponding to the minimum distance, the display apparatus corresponding to the signal emission angle closest to an initial angle is selected as the selected device. In response to the minimum distance corresponding to one of the display apparatuses, the display apparatuses corresponding to the minimum distance is taken as the selected display apparatus.

In an embodiment of the disclosure, if the signal emission angles closest to the initial angle are more than one, among the display apparatuses corresponding to the signal emission angles closest to the initial angle, the display apparatuses scanned earlier in time order is taken as the selected display apparatus.

In an embodiment of the disclosure, the positioning chip is an Ultra-wideband (UWB) wireless communication chip, a Bluetooth Low Energy (BLE) wireless communication chip, or a sound location chip.

In an embodiment of the disclosure, the signal emission angle includes multiple angles from 0 to 360 degrees.

In an embodiment of the disclosure, the single or the multiple display apparatuses are disposed in a field, the field is provided with geofencing, and the method further includes the following. In response to the mobile apparatus receiving a signal sent by the geofencing, the positioning chip is driven to scan at the signal emission angles within the preset range.

In an embodiment of the disclosure, the method further includes the following. In response to a change in the distance between the selected display apparatus and the mobile apparatus, the positioning chip is driven to scan at the signal emission angles within the preset range respectively to select another selected display apparatus.

The automatic communicative connection system of the disclosure includes multiple display apparatuses and a mobile apparatus. The display apparatuses are disposed in a field. The mobile apparatus includes a positioning chip and a processor. The processor is configured to drive a positioning chip to scan with multiple signal emission angles within a preset range in the field; when a single display apparatus is scanned within the preset range, select the single display apparatus as a selected display apparatus; when multiple display apparatuses are scanned within the preset range, select one of the display apparatuses as the selected display apparatus according to multiple corresponding distances respectively between the display apparatuses and the mobile apparatus as well as multiple of the signal emission angles corresponding to the display apparatuses with the mobile apparatus; and the mobile apparatus communicatively connects with the selected display apparatus.

The mobile apparatus of the disclosure is adapted to be communicatively connected to a selected display apparatus, and the mobile apparatus includes a positioning chip and a processor. The positioning chip is used to scan with multiple signal emission angles within a preset range. The processor is coupled to the positioning chip, and the processor is configured to select the single display apparatus as the selected display apparatus when a single display apparatus is scanned within the preset range, or the processor is configured to select one of the display apparatuses as the selected display apparatus when multiple display apparatuses are scanned within the preset range according to multiple corresponding distances respectively between the display apparatuses and the mobile apparatus as well as multiple of the signal emission angles corresponding to the display apparatuses with the mobile apparatus. The mobile apparatus communicatively connects with the selected display apparatus.

In an embodiment of the disclosure, the positioning chip is configured to adjust sequentially to scan with a plurality of other angles of the signal emission angles after starting to scan at an initial angle of the signal emission angles, wherein the positioning chip is configured to emit a plurality of apparatus search signals correspondingly based on the signal emission angles; and in response to the positioning chip receives at least one response signal from the single or the plurality of display apparatuses, the positioning chip is configured to transmit the at least one response signal to the processor, such that the processor obtains apparatus information and positioning information corresponding to each of the display apparatuses according to the at least one response signal, wherein each of the at least one response signal corresponds to one of the apparatus search signals.

In an embodiment of the disclosure, the processor is configured to determine whether a scan within the preset range is completed, if the scan within the preset range is completed, the processor is configured to determine that the apparatus information within the preset range is collected; and if the scan within the preset range is not completed, the processor is configured to drive the positioning chip to continue scanning until the positioning chip completes the scan with all the signal emission angles.

In an embodiment of the disclosure, the apparatus information comprises at least one of an apparatus name, an Internet Protocol (IP) address, a service set identifier, and a network setting, wherein the network setting is used to indicate that one of the single or the plurality of display apparatuses transmitting one of the at least one response signal is in an access point (AP) mode or a station mode, the positioning information comprises one of the corresponding distances between each of the display apparatus and the mobile apparatus and one of the corresponding signal emission angles corresponding to the each of the display apparatus with the mobile apparatus.

In an embodiment of the disclosure, the mobile apparatus comprises a storage, wherein in response to the positioning chip receiving the at least one response signal from the single or the plurality of display apparatuses, the processor is configured to: if the storage has not stored the apparatus name of any one of the single or the plurality of display apparatuses, add the apparatus information and the positioning information corresponding to the apparatus name; and if the storage has stored the apparatus name, overwrite the apparatus information and the positioning information corresponding to the apparatus name.

In an embodiment of the disclosure, the processor is configured to: when the display apparatuses are scanned within the preset range, obtain a minimum distance from the corresponding distances between the display apparatuses and the mobile apparatus; in response to the minimum distance corresponding to the plurality of the display apparatuses, among the signal emission angles corresponding to the display apparatuses corresponding to the minimum distance, select one of the display apparatuses corresponding to the signal emission angle closest to an initial angle as the selected device; and in response to the minimum distance corresponding to one of the display apparatuses, take the one of the display apparatuses corresponding to the minimum distance as the selected display apparatus.

In an embodiment of the disclosure, the processor is configured to: in response to the signal emission angles closest to the initial angle being more than one, among the display apparatuses corresponding to the signal emission angles closest to the initial angle, take one of the display apparatuses scanned earlier in time order as the selected display apparatus.

In an embodiment of the disclosure, the positioning chip is an Ultra-wideband wireless communication chip, a Bluetooth Low Energy wireless communication chip, or a sound location chip.

In an embodiment of the disclosure, the signal emission angles comprise a plurality of angles from 0 to 360 degrees.

In an embodiment of the disclosure, the single or the plurality of display apparatuses are disposed in a field, the field is provided with geofencing, and the processor is configured to: in response to the mobile apparatus receiving a signal sent by the geofencing, drive the positioning chip to scan at the signal emission angles within the preset range.

In an embodiment of the disclosure, the processor is configured to: in response to a change in the distance between the selected display apparatus and the mobile apparatus, drive the positioning chip to scan at the signal emission angles within the preset range respectively to select another selected display apparatus.

In an embodiment of the disclosure, the processor is further configured to transfer a personal data of the mobile apparatus to the selected display apparatus, such that the selected display apparatus obtains the personal data corresponding to a user.

Based on the above, this disclosure may be grouped, so that the mobile apparatus may be grouped and communicatively connected with the most suitable (selected) display apparatus, saving a lot of operation time.

To make the aforementioned more comprehensive, several embodiments accompanied with drawings are described in detail as follows.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

The aforementioned and other technical contents, features, and effects of the disclosure will be clearly presented in the following detailed description of a preferred embodiment with reference to the drawings. The directional terms mentioned in the following embodiments, such as: up, down, left, right, front or back are only directions referring to the attached drawings. Accordingly, the directional terms used are illustrative and not intended to limit the disclosure.

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations herein is meant to encompass the items listed thereafter and equivalents thereof as well as additional items. Unless limited otherwise, the terms "connected," "coupled," and "mounted," and variations therein are used broadly and encompass direct and indirect connections, couplings, and mountings.

Figure 1:
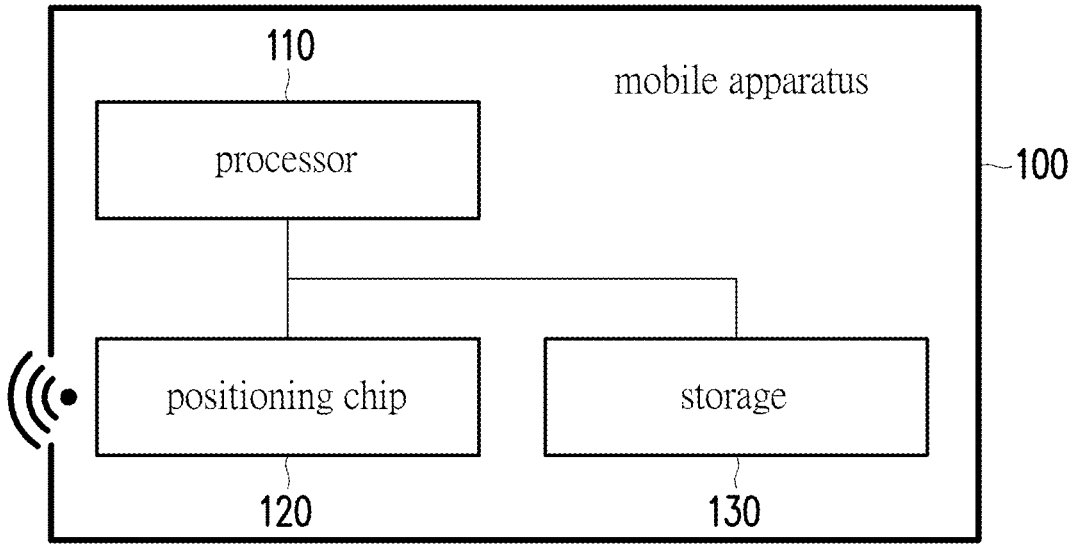
FIG. 1 is a block diagram of a mobile apparatus according to an embodiment of the disclosure.

FIG. 1 is a block diagram of a mobile apparatus according to an embodiment of the disclosure. Referring to FIG. 1, a mobile apparatus 100 includes a processor 110, a positioning chip 120, and a storage 130. The processor 110 is coupled to the positioning chip 120 and the storage 130. In this embodiment, the mobile apparatus 100 is, for example, a personal device used by a user, such as a smart phone, a tablet computer, a laptop.

The processor 110 is, for example, a central processing unit (CPU), a physics processing unit (PPU), a programmable microprocessor, an embedded control chip, a digital signal processor (DSP), an application specific integrated circuit (ASIC), or other similar apparatuses.

The positioning chip 120 is, for example, an Ultra-wideband (UWB) wireless communication chip, a Bluetooth Low Energy (BLE) wireless communication chip, or a sound location chip. In an embodiment, the positioning chip 120 may be any chip that can perform indoor positioning techniques to identify the distance and their relative direction between two apparatuses.

The storage 130 may be any type of fixed or removable random access memory (RAM), read-only memory (ROM), flash memory, hard disk, or other similar devices or a combination of these devices. The storage 130 includes one or more code segments, which, when installed, are executed by the processor 110 to implement the following method for communicatively connecting to the display apparatus.

Figure 2:
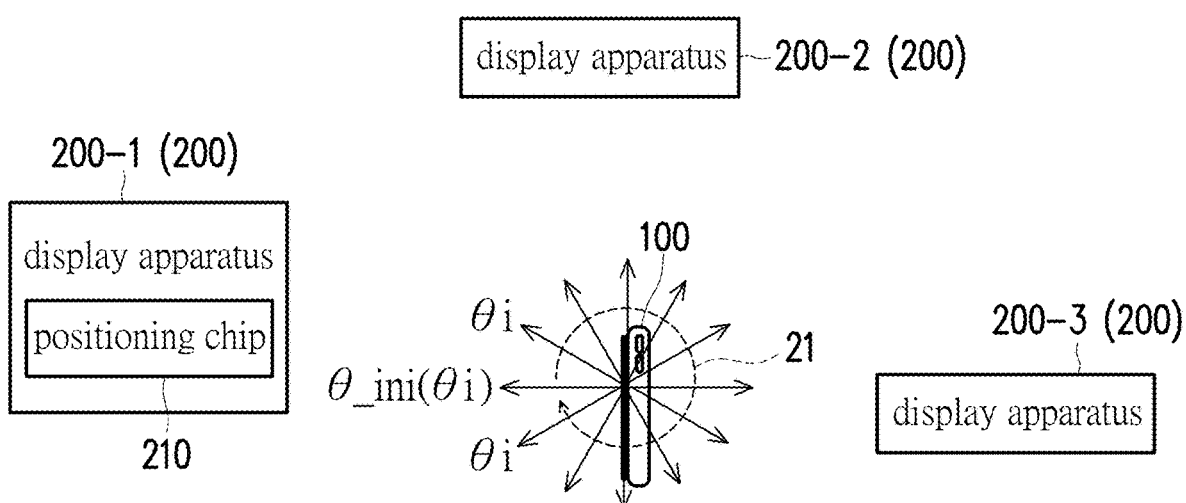
FIG. 2 is a block diagram of an automatic communicative connection system according to an embodiment of the disclosure.

FIG. 2 is a block diagram of an automatic communicative connection system according to an embodiment of the disclosure. In this embodiment, four display apparatuses 200-1 to 200-4 (collectively referred to as display apparatuses 200) are used for illustration, but the number of display apparatuses is not limited thereto. In other embodiments, it is possible to have only a single display apparatus, or 2, 3, 5 or more display apparatuses. Each of the display apparatuses 200 may be a projector, an interactive flat panel (IFP) display, a touch display, a liquid crystal display (LCD), a plasma display, or other electronic apparatuses with display functions.

The display apparatus 200 includes a positioning chip 210 using the same positioning technology as the mobile apparatus 100. For example, if the mobile apparatus 100 uses a UWB (Ultra-wideband) wireless communication chip, then the display apparatus 200 is also configured with a UWB wireless communication chip. In FIG. 2, only the positioning chip 210 of the display apparatus 200-1 is shown, while the display apparatuses 200-2 to 200-4 are not shown, but each of them includes the positioning chip 210.

The mobile apparatus 100 may use the positioning chip 120 to scan the display apparatus 200 within a preset range, where the preset range is, for example, a detectable range of the positioning chip 120. The mobile apparatus 100 selects one display apparatus 200 as a selected display apparatus based on the distance found between the display apparatus 200 and the mobile apparatus 100 and the relative position between the display apparatus 200 and the mobile apparatus 100, so that the mobile apparatus 100 is communicatively connected to the selected display apparatus. For example, the mobile apparatus 100 drives the positioning chip 120 to emit radio wave for adjusting a signal emission angle θi of an antenna of the positioning chip 120 in a clockwise direction 21 starting with an initial angle θ_ini of 0 degrees. The radio wave may comprise apparatus search signal. The mobile apparatus, as an original point, emits the radio wave with the signal emission angle. The signal emission angle θi is in a range of 0 to 360 degrees. In another embodiment, the positioning chip 120 may also be adjusted counterclockwise to adjust the signal emission angle θi of the antenna of the positioning chip 120.

In a preferred embodiment, the positioning chip 120 is specified as a UWB (Ultra-wideband) wireless communication chip. UWB is a carrier free communication technology, that is, UWB uses pulses with extremely short time intervals for communication. UWB has the characteristics of strong anti-interference, low power consumption, high-speed transmission, and precise positioning capabilities. In terms of positioning technology, UWB uses time of flight (ToF) to achieve centimeter-level positioning accuracy. In addition, the angular accuracy of the UWB antenna array may be, for example, within 5 degrees. Therefore, in a field where there are multiple display apparatuses 200 and the each of the display apparatuses 200 is equipped with a UWB wireless communication chip (positioning chip 210), the distance and angle between the display apparatuses 200 and the mobile apparatus 100 may be calculated using this precise positioning technique.

For example, in the case of the mobile apparatus 100 and the display apparatuses 200 using UWB (Ultra-wideband) wireless communication chip (positioning chip 120/210), the positioning method is done by the signal transmission time for distance measurement, that is, the time of flight (ToF) method. For example, the mobile apparatus 100 emits an apparatus search signal and records a time stamp t0. Afterwards, after receiving the apparatus search signal, the display apparatus 200 transmits back a response signal to the mobile apparatus 100 after a delay time $T_{reply}$ (a known processing time). The mobile apparatus 100 receives the response signal and records a time stamp time t1. The mobile apparatus 100 may obtain a time difference $T_{round}=t1-t0$ based on the two time stamps t0 and t1. After that, the mobile apparatus 100 may calculate a signal transmission time $T_{prob}$ in one direction based on the time difference $T_{round}$ and the delay time $T_{reply}$, that is, $T_{prob}=(T_{round}-T_{reply})/2$.

In the case where multiple apparatuses (mobile apparatus 100/display apparatuses 200) use the UWB wireless communication chip (positioning chip 120/210) simultaneously, the signals (apparatus search signal/response signal) sent by the UWB wireless communication chips are short-wave pulses of very short duration, and therefore do not interfere with each other, whereby the mobile apparatus 100 and multiple display apparatus 200 may be positioned simultaneously in the same space. In addition, the UWB wireless communication chip may transmit data at a rate of, for example, up to 54 million bytes per second (mbps), which allows each mobile apparatus 100 to be quickly communicatively connected to a corresponding display apparatus 200 for use in groups.

In an embodiment, the mobile apparatus 100 has an automatic grouping mechanism, that is, the mobile apparatus 100 may find a display apparatus 200 and make the mobile apparatus 100 communicatively connect with it. The automatic grouping mechanism includes automatically scanning the display apparatus 200, collecting apparatus information of the display apparatus 200, and communicatively connecting with the display apparatus 200. For example, the display apparatuses 200-1 to 200-4 are disposed in the same field (such as classrooms, meeting rooms), and the field is provided with a geofencing. The geofencing means a virtually created geographical boundary. In response to a transceiver of the mobile apparatus 100 receiving a signal sent by the geofencing, the processor 110 drives the positioning chip 120, so that the positioning chip 120 scans with multiple signal emission angles θi within the preset range.

In another embodiment, the one or more code segments included in the mobile apparatus 100 for communicatively connecting to the display apparatus 200 are configured to continuously activate the automatic grouping mechanism to continuously scan the adjacent display apparatus 200. Alternatively, in other embodiments, the automatic grouping mechanism may also be activated by a human.

Figure 3:
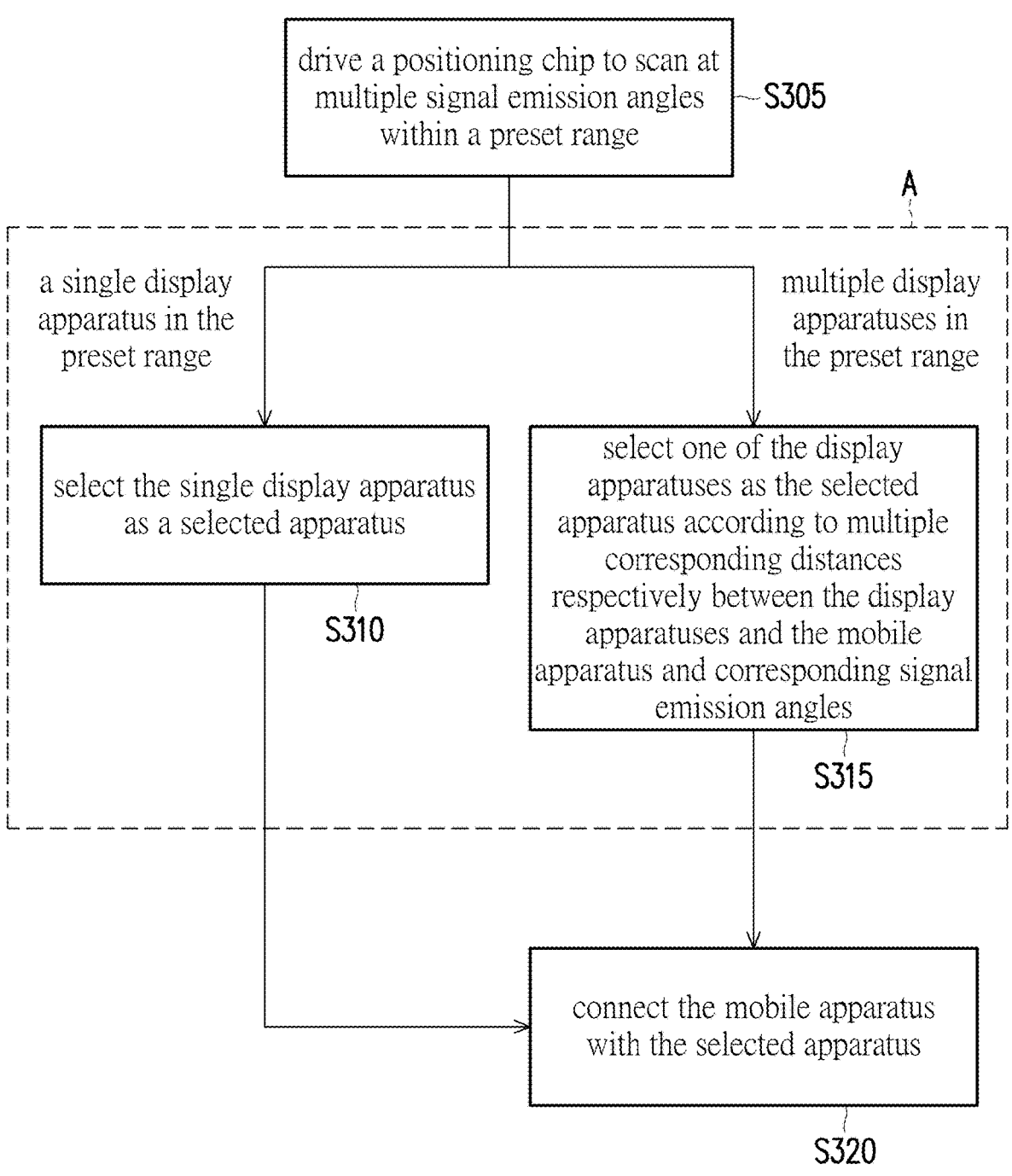
FIG. 3 is a flowchart of a method for communicatively connecting to a display apparatus according to an embodiment of the disclosure.

FIG. 3 is a flowchart of a method for communicatively connecting to a display apparatus according to an embodiment of the disclosure. Referring to FIG. 1 to FIG. 3 at the same time, in step S305, the processor 110 of the mobile apparatus 100 drives the positioning chip 120 to scan with multiple signal emission angles θi within the preset range. The signal emission angles θi include multiple of 0 to 360 degrees. The positioning chip 120 of the mobile apparatus 100 has an antenna for directivity control to adjust the signal emission angle θi. The positioning chip 120 of the mobile apparatus 100 may adjust the signal emission angle θi and transmit the apparatus search signal to scan the field 360 degrees.

The positioning chip 120 first scans at the initial angle θ_ini of the signal emission angles θi, and then sequentially adjusts to scan at other angles of the signal emission angles θi. The positioning chip 120 correspondingly emits multiple apparatus search signals based on the signal emission angle θi. In response to receiving the response signal from the display apparatus 200, the response signal is sent to the processor 110, so that the processor 110 obtains apparatus information and positioning information corresponding to the each of the display apparatuses 200. If the positioning chip 210 in the display apparatus 200 receives the apparatus search signal sent by the mobile apparatus 100, a response signal is sent back to the positioning chip 120 of the mobile apparatus 100. That is, the response signal is sent corresponding to the apparatus search signal.

Figure 4:
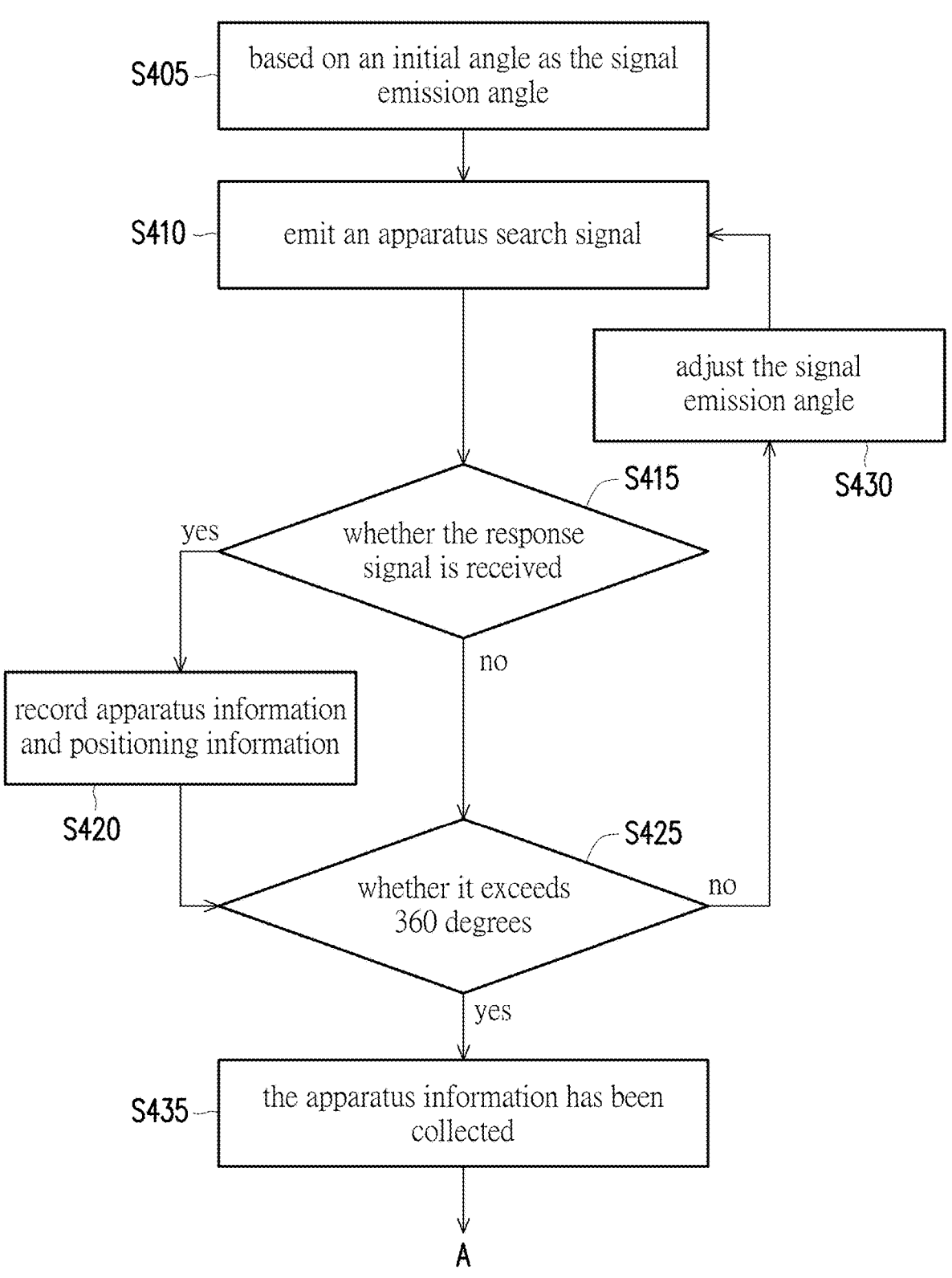
FIG. 4 is a flowchart of a method for scanning a display apparatus according to an embodiment of the disclosure.

For example, FIG. 4 is a flowchart of a method for scanning a display apparatus according to an embodiment of the disclosure. Referring to FIG. 4, in step S405, the positioning chip 120 of the mobile apparatus 100 is based on the initial angle θ_ini (for example, 0 degrees) as the signal emission angle θi. The initial angle θ_ini is, for example, an angle at which the antenna of the positioning chip 120 is currently pointing, that is, the angle at which scanning starts.

Next, in step S410, the positioning chip 120 of the mobile apparatus 100 emits an apparatus search signal correspondingly based on the signal emission angle θi. In step S415, the positioning chip 120 of the mobile apparatus 100 determines whether the response signal from the display apparatus 200 is received.

In response to the positioning chip 120 of the mobile apparatus 100 not receiving any response signal, in step S425, the processor 110 determines whether the signal emission angle θi exceeds 360 degrees. If it has not exceeded 360 degrees, in step S430, the positioning chip 120 adjusts the signal emission angle θi, and then returns to step S410. For example, the adjustment amount of the positioning chip 120 for each adjustment of the signal emission angle θi is, for example, an increase of 5 to 15 degrees. For example, the signal emission angle θi includes 0 degrees, 10 degrees, 20 degrees, 30 degrees . . . 350 degrees, 360 degrees. In other words, the positioning chip 120 is set to adjust the signal emission angle θi of the antenna by increasing 10 degrees each time since the initial angle θ_ini is 0 degrees.

In response to the positioning chip 120 of the mobile apparatus 100 receives the response signal from the display apparatus 200, and the positioning chip 120 transmits the response signal to the processor 110, in step S420, the processor 110 obtains and records the scanned apparatus information and positioning information of the each of the display apparatuses 200 according to the response signal. Specifically, if the positioning chip 210 in the display apparatus 200 receives the apparatus search signal sent by the mobile apparatus 100, a response signal will be sent back to the positioning chip 120 of the mobile apparatus 100. The response signal includes the apparatus information of the display apparatus 200 (assumed to be the display apparatus 200-1) itself that received the apparatus search signal. For example, the positioning chip 210 of the display apparatus 200-1 carries the apparatus information in the response signal. In addition, the positioning chip 120 disposed in the mobile apparatus 100 and the positioning chip 210 disposed in the display apparatus 200 may realize indoor positioning to obtain the distance between the mobile apparatus 100 and the display apparatus 200-1. The positioning chip 120 transmits the response signal to the processor 110. The processor 110 obtains the apparatus information corresponding to the display apparatus 200-1, and calculates the distance between the two to obtain the positioning information.

The apparatus information includes at least one of an apparatus name, an Internet Protocol (IP) address, a service set identifier (SSID), and a network setting. The network setting is used to indicate that the display apparatus 200 transmitting the response signal is in an access point (AP) mode or a station mode. The positioning information includes the distance between the each of the display apparatuses 200 transmitting back the response signal and the mobile apparatus 100 and the current signal emission angle θi (the angle at which the positioning chip 120 emits the apparatus search signal).

In step S420, if the storage 130 of the mobile apparatus 100 has not stored the apparatus name of the display apparatus 200 currently being searched, the processor 110 adds apparatus information and positioning information of the apparatus name corresponding to the display apparatus 200 newly being searched. If the storage 130 of the mobile apparatus 100 has stored the apparatus name of the display apparatus 200 currently being searched, the processor 110 overwrites the corresponding apparatus information and positioning information stored in the storage 130 for this apparatus name.

That is, if the display apparatus 200-2 has never been searched by the mobile apparatus 100, the mobile apparatus 100 will add apparatus information and positioning information corresponding to the display apparatus 200-2 in the storage 130. If the display apparatus 200-1 has been previously searched by the mobile apparatus 100, the mobile apparatus 100 updates (overwrites) the apparatus information and positioning information corresponding to the display apparatus 200-1 in the storage 130.

After that, in step S425, the processor 110 determines whether the signal emission angle θi of the positioning chip 120 exceeds 360 degrees. If it does not exceed 360 degrees, in step S430, the processor 110 drives the positioning chip 120 to adjust the signal emission angle θi, and then returns to step S410 until the positioning chip 120 completes the scan with all the signal emission angles θi (such as 0 degrees, 10 degrees, 20 degrees, 30 degrees, . . . , 350 degrees, 360 degrees). If it exceeds 360 degrees or 360 degrees have been reached, for example, after the positioning chip 120 scans the preset range of 0 to 360 degrees, in step S435, the processor 110 determines that the apparatus information in the preset range has been collected, and then returns to step A in FIG. 3 to select a selected display apparatus.

Returning to FIG. 3, after scanning within the preset range, in response to a single display apparatus being scanned within the preset range, in step S310, the single display apparatus 200 is selected as the selected display apparatus. Afterwards, in step S320, the mobile apparatus 100 is communicatively connected with the selected display apparatus.

On the other hand, in response to multiple display apparatuses 200 being scanned within the preset range (as shown in FIG. 2), in step S315, one of the display apparatuses 200 is selected as the selected display apparatus according to multiple corresponding distances respectively between the display apparatuses 200 and the mobile apparatus 100 and multiple of the signal emission angles θi corresponding to the display apparatuses 200. That is, the selected display apparatus is selected according to the distance and relative direction between the searched display apparatus 200 and the mobile apparatus 100. Then, in step S320, the mobile apparatus 100 is communicatively connected with the selected display apparatus.

In one scenario, the processor 110 selects the display apparatus 200 with the smallest distance from the mobile apparatus 100 as the selected display apparatus. In another scenario, if there are multiple display apparatuses 200 with the smallest distance from the mobile apparatus 100 in the field, the display apparatus 200 with the signal emission angle θi closest to the initial angle is preferred as the selected display apparatus. That is, in response to a minimum distance corresponding to multiple display apparatuses 200, among the signal emission angles θi corresponding to the display apparatus 200 corresponding to the minimum distance, one display apparatus 200 corresponding to the signal emission angle θi closest to the initial angle θ_ini is selected as the selected device For example, the initial angle θ_ini is 0 degrees, if the display apparatus 200 with the minimum distance from the mobile apparatus 100 is detected in both the 30-degree direction and the 180-degree direction, the display apparatus 200 detected in the 30-degree direction that is closest to the initial angle θ_ini is preferred as the selected display apparatus. In addition, assuming that the initial angle θ_ini is 0 degrees, if the display apparatus 200 with the minimum distance from the mobile apparatus 100 is detected in both the 330-degree direction and the 180-degree direction, the display apparatus 200 detected in the 330-degree direction that is closest to the initial angle θ_ini is preferred as the selected display apparatus. It should be noted that the signal emission angle $\theta i$ closest to the initial angle $\theta\_ini$ is defined as the minimum angle to be adjusted from the initial angle $\theta\_ini$ in a forward (clockwise) or reverse (counterclockwise) manner. For example, when the signal emission angle $\theta i$ is 180 degrees, it is needed to adjust 180 degrees from the initial angle $\theta\_ini$ by forward or reverse manner, and when the signal emission angle $\theta i$ is 330 degrees, it is needed to adjust 30 degrees from the initial angle $\theta\_ini$ by reverse manner. Accordingly, 330 degrees is the closest angle to the initial angle $\theta\_ini$.

The following are examples of the above two scenarios.

Figure 5:
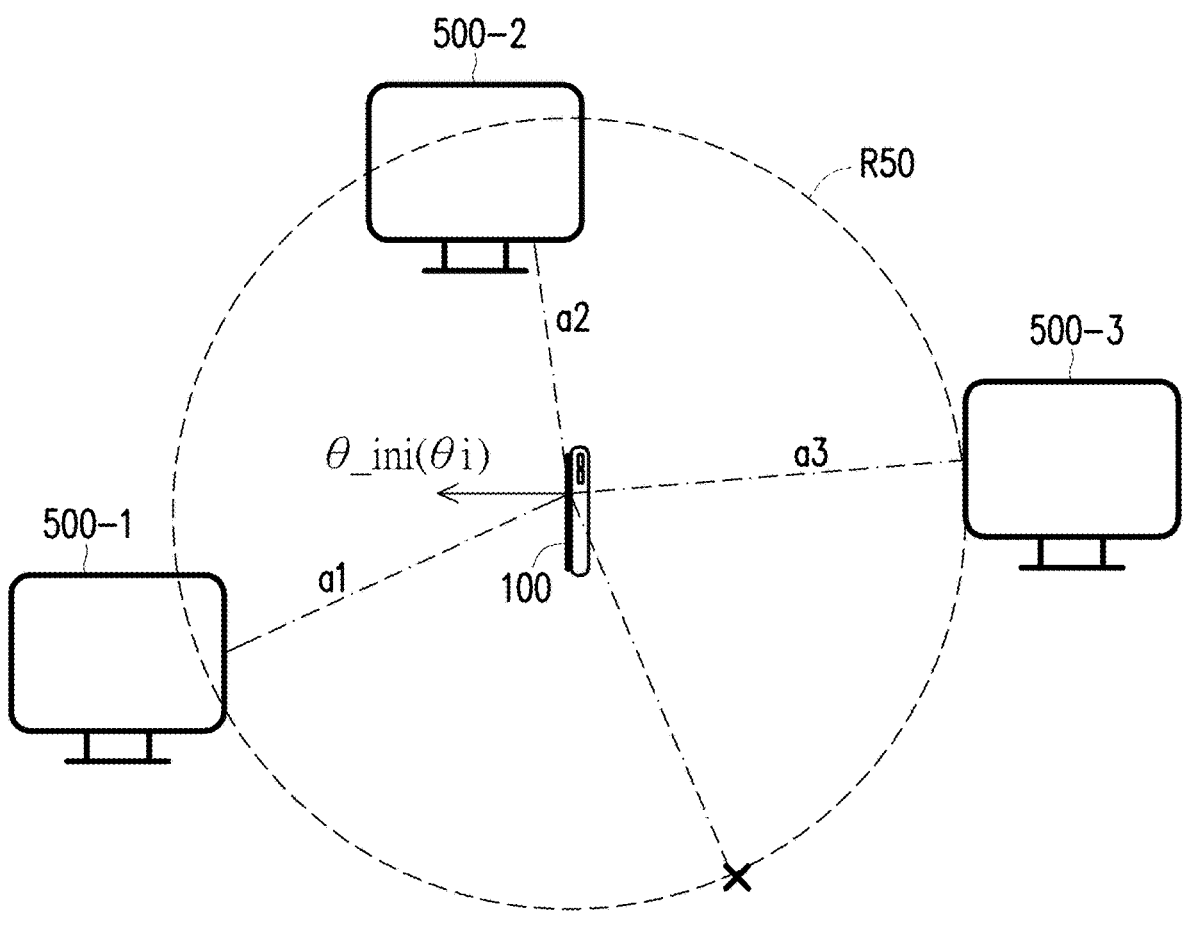
FIG. 5 is a schematic diagram of selection of a selected display apparatus in one of scenarios according to an embodiment of the disclosure.
Figure 5:
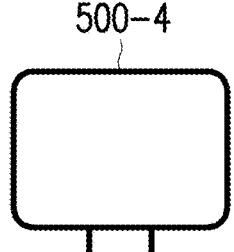

FIG. 5 is a schematic diagram of selection of a selected display apparatus in one of scenarios according to an embodiment of the disclosure. Referring to FIG. 5, in this embodiment, it is assumed that four display apparatuses 500-1 to 500-4 are included in the same field. After the steps S405 to S435, the mobile apparatus 100 searches for display apparatus 500-1, 500-2, and 500-3 within a preset range R50 (the detection range of the positioning chip 120) of the mobile apparatus 100. That is, only the display apparatus 500-1, 500-2, and 500-3 can communicatively connect with the mobile apparatus 100, while the display apparatus 500-4 cannot communicatively connect with the mobile apparatus 100.

In this embodiment, the mobile apparatus 100 automatically communicatively connects with the nearest display apparatus. Specifically, the processor 110 obtains the minimum distance, i.e., a distance a2, from corresponding distances a1, a2, and a3 between the display apparatuses 500-1, 500-2, and 500-3 and the mobile apparatus 100. The processor 110 selects the display apparatus 500-2 corresponding to the distance a2 as the selected display apparatus, and automatically communicatively connects with the display apparatus 500-2.

Figure 6:
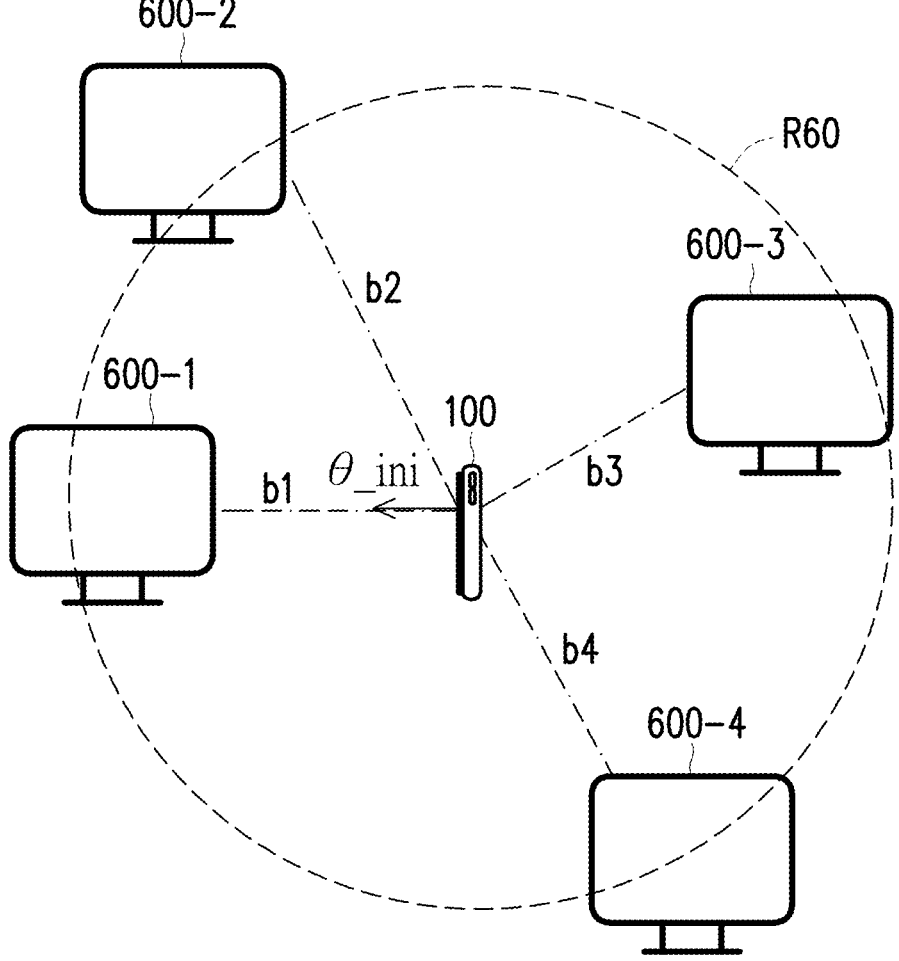
FIG. 6 is a schematic diagram of selection of a selected display apparatus in another scenario according to an embodiment of the disclosure.

FIG. 6 is a schematic diagram of selection of a selected display apparatus in another scenario according to an embodiment of the disclosure. Referring to FIG. 6, in this embodiment, it is assumed that four display apparatuses 600-1 to 600-4 are included in the same field. After the steps S405 to S435, the mobile apparatus 100 searches for display apparatus 600-1, 600-2, 600-3, and 600-4 within a preset range R60 (the detection range of the positioning chip 120) of the mobile apparatus 100. That is, the display apparatus 600-1 to 600-4 can all be communicatively connected with the mobile apparatus 100.

The mobile apparatus 100 automatically calculates distances b1, b2, b3, and b4 from the display apparatus 600-1 to 600-4, where the minimum distance among the distances b1, b2, b3, and b4 is plural, i.e., the distance b1 and the distance b3. In this embodiment, the processor 110 selects the display apparatus 600-1 corresponding to the signal emission angle $\theta i$ closest to the initial angle $\theta\_ini$ as the selected display apparatus from the signal emission angle $\theta i$ corresponding to the display apparatus 600-1 and the display apparatus 600-3 corresponding to the distance b1 and the distance b3. Accordingly, the user may use the display apparatus 600-1 with a minimum turning range instead of turning around to use the display apparatus 600-3.

In addition, if the signal emission angles $\theta i$ closest to the initial angle $\theta\_ini$ are more than one, among the display apparatuses corresponding to the direction closest to the initial angle $\theta\_ini$, a display apparatus scanned earlier in time order is taken as the selected display apparatus. For example, assuming that the distance between the display apparatus scanned at a signal emission angle of 5 degrees and the display apparatus scanned at a signal emission angle of 355 degrees and the mobile apparatus 100 is the minimum distance, the display apparatus corresponding to the first scanned signal emission angle of 5 degrees is preferred as the selected display apparatus.

In another embodiment, in response to a change in the distance between the selected display apparatus and the mobile apparatus 100, the processor 110 may drive the positioning chip 120 to scan with multiple signal emission angles $\theta i$ within the preset range respectively to select another selected display apparatus. For example, if a change in the distance b1 between the mobile apparatus 100 and the display apparatus 600-1 is detected, the mobile apparatus 100 drives the positioning chip 120 to re-execute steps S405 to S435 to re-find the display apparatus within the preset range after the movement and re-select the selected display apparatus.

For example, if the distance between the position of the mobile apparatus 100 and the display apparatus 600-2 after moving is the shortest, the display apparatus 600-2 is used as the selected display apparatus, and the mobile apparatus 100 switches from being communicatively connected to the display apparatus 600-1 to being communicatively connected to the display apparatus 600-2. In other words, after the mobile apparatus 100 moves, it is rescanned to find a more suitable display apparatus and automatically switches the display apparatus communicatively connected to the mobile apparatus 100.

Returning to FIG. 5, the automatic communicative connection method may be extended to automatic sign-in. The processor 110 of the mobile apparatus 100 is also used to transmit the personal data stored in the storage 130 to the display apparatus (the selected display apparatus) communicatively connected with the mobile apparatus 100, so that the selected display apparatus obtains the personal data of the user. For example, in an application environment of a teaching field (such as a classroom), the display apparatuses 500-1 to 500-4 are disposed, and the mobile apparatuses 100 are held by students. When a student enters this field, his mobile apparatus 100 automatically activates the grouping mechanism, and the mobile apparatus 100 is automatically communicatively connected to the display apparatus 500-2. After the communicative connection, the mobile apparatus 100 transmits his stored personal information (e.g., student name, email address, student number, etc.) to the display apparatus 500-2, which transmits the personal information of the mobile apparatus 100 to the electronic apparatus used by a teacher.

This allows the teacher to know which student's mobile apparatus is communicatively connected to one of display apparatuses in the classroom.

Returning to FIG. 2, the automatic communicative connection method may be extended to an automatic login, i.e., the display apparatus 200 may store usage data of the mobile apparatus 100 of the user for subsequent use by the mobile apparatus 100 communicatively reconnected to the display apparatus 200 to load previously stored usage data. For example, if the mobile apparatus 100 was previously communicatively connected to the display apparatus 200-1, the display apparatus 200-1 stores the usage data corresponding to the mobile apparatus 100. When the mobile apparatus 100 is communicatively connected to the display apparatus 200-1 again, the display apparatus 200-1 may automatically load the usage data stored in the previous class or meeting of the mobile apparatus 100 during the class or meeting.

To sum up, the disclosure utilizes the positioning technology of the positioning chip to calculate the distance between the display apparatus and the mobile apparatus and to determine the relative direction, and then select the most suitable display apparatus among multiple display apparatuses for communicative connection. Accordingly, when one or more mobile apparatuses enter a field with multiple display apparatuses, especially when multiple users encounter a grouping session in a meeting or classroom and multiple mobile apparatuses need to be communicative connected to one of the multiple display apparatuses used in the corresponding grouping, the mobile apparatuses may be automatically assigned to the corresponding display apparatus (with the shortest distance and the smallest angle relative to a direction in which the mobile apparatus is facing) without manual selection, saving a lot of operating time. In addition, if the mobile apparatus has a location change, the mobile apparatus may achieve accurate and fast grouping update.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A method for communicatively connecting to a selected display apparatus, performed by a processor of a mobile apparatus, the method comprising:

driving a positioning chip of the mobile apparatus to scan from 0 to 360 degrees about the positioning chip;

in response to a single display apparatus being scanned by the mobile apparatus, selecting the single display apparatus as the selected display apparatus by the mobile apparatus;

in response to a plurality of display apparatuses being scanned by the mobile apparatus, selecting one of the plurality of display apparatuses as the selected display apparatus, by the mobile apparatus, according to a plurality of corresponding distances respectively between the plurality of display apparatuses and the mobile apparatus as well as a plurality of signal emission angles corresponding to the plurality of display apparatuses with respect to the mobile apparatus; and communicatively connecting the mobile apparatus with the selected display apparatus.

2. The method according to claim 1, wherein the step of driving the positioning chip of the mobile apparatus to scan from 0 to 360 degrees about the positioning chip comprises:

after starting to scan at an initial angle of the plurality of signal emission angles by the positioning chip, sequentially adjusting to scan with other angles of the plurality of signal emission angles, wherein the positioning chip is configured to emit a plurality of apparatus search signals based on the plurality of signal emission angles; and in response to the positioning chip receiving at least one response signal from the single or the plurality of display apparatuses, transmitting the at least one response signal to the processor to obtain apparatus information and positioning information corresponding to each of the display apparatuses, wherein each of the at least one response signal corresponds to one of the apparatus search signals.

3. The method according to claim 2 further comprising:

determining whether a scan from 0 to 360 degrees about the positioning chip is completed by the processor;

if the scan is completed, determining that the apparatus information is collected; and if the scan is not completed, driving the positioning chip to continue scanning until the positioning chip completes the scan.

4. The method according to claim 2, wherein the apparatus information comprises at least one of an apparatus name, an Internet Protocol (IP) address, a service set identifier (SSID), and a network setting, wherein the network setting is used to indicate that one of the single or the plurality of display apparatuses transmitting one of the at least one response signal is in an access point (AP) mode or a station mode, and the positioning information comprises one of the corresponding distances between each of the display apparatus and the mobile apparatus and one of the corresponding signal emission angles corresponding to the each of the display apparatus with the mobile apparatus.

5. The method according to claim 4, wherein in response to the positioning chip receiving the at least one response signal from the single or the plurality of display apparatuses further comprising:

if a storage of the mobile apparatus has not stored the apparatus name of any one of the single or the plurality of display apparatuses, adding the apparatus information and the positioning information corresponding to the apparatus name by the processor; and if the storage of the mobile apparatus has stored the apparatus name, overwriting the apparatus information and the positioning information corresponding to the apparatus name by the processor.

6. The method according to claim 1 further comprising:

in response to the display apparatuses being scanned, obtaining a minimum distance from the corresponding distances between the display apparatuses and the mobile apparatus;

in response to the minimum distance corresponding to the plurality of the display apparatuses, among the plurality of signal emission angles corresponding to the display apparatuses corresponding to the minimum distance, selecting one of the display apparatuses corresponding to the signal emission angle closest to an initial angle as the selected device; and in response to the minimum distance corresponding to one of the display apparatuses, taking the one of the display apparatuses corresponding to the minimum distance as the selected display apparatus.

7. The method according to claim 6, wherein if the plurality of signal emission angles closest to the initial angle are more than one, among the display apparatuses corresponding to the plurality of signal emission angles closest to the initial angle, taking one of the display apparatuses scanned earlier in time order as the selected display apparatus.

8. The method according to claim 1, wherein the positioning chip is an Ultra-wideband wireless communication chip, a Bluetooth Low Energy wireless communication chip, or a sound location chip.

9. The method according to claim 1 further comprising:

in response to a change in the distance between the selected display apparatus and the mobile apparatus, driving the positioning chip to scan from 0 to 360 degrees about the positioning chip respectively to select another selected display apparatus.

10. An automatic communicative connection system comprising:

at least one display apparatuses; and a mobile apparatus comprising a positioning chip and a processor, wherein the processor is configured to drive a positioning chip to scan from 0 to 360 degrees about the positioning chip, and the processor is configured to select a single display apparatus as a selected display apparatus in response to the single display apparatus being scanned, or in response to a plurality of display apparatuses being scanned, select one of a plurality of display apparatuses as the selected display apparatus according to a plurality of corresponding distances respectively between the display apparatuses and the mobile apparatus as well as a plurality of signal emission angles corresponding to the plurality of display apparatuses with respect to the mobile apparatus, and wherein the mobile apparatus is configured to communicatively connect with the selected display apparatus.

11. A mobile apparatus adapted to be communicatively connected to a selected display apparatus, the mobile apparatus comprising:

a positioning chip configured to scan from 0 to 360 degrees about the positioning chip; and a processor coupled to the positioning chip, and wherein the processor is configured to select a single display apparatus as the selected display apparatus in response to the single display apparatus being scanned, or in response to a plurality of display apparatuses being scanned, select one of the plurality of display apparatuses as the selected display apparatus according to a plurality of corresponding distances respectively between the display apparatuses and the mobile apparatus as well as a plurality of signal emission angles corresponding to the plurality of display apparatuses with respect to the mobile apparatus; and wherein the mobile apparatus is configured to communicatively connect with the selected display apparatus.

12. The mobile apparatus according to claim 11, wherein the positioning chip is configured to adjust sequentially to scan with other angles of the plurality of signal emission angles after starting to scan at an initial angle of the plurality of signal emission angles, wherein the positioning chip is configured to emit a plurality of apparatus search signals correspondingly based on the plurality of signal emission angles; and in response to the positioning chip receiving at least one response signal from the single display apparatus or the plurality of display apparatuses, the positioning chip is configured to transmit the at least one response signal to the processor, such that the processor is configured to obtain apparatus information and positioning information corresponding to each of the display apparatuses according to the at least one response signal, wherein each of the at least one response signal corresponds to one of the apparatus search signals.

13. The mobile apparatus according to claim 12, wherein the processor is configured to determine whether a scan from 0 to 360 degrees about the positioning chip is completed, if the scan is completed, the processor is configured to determine that the apparatus information is collected; and if the scan is not completed, the processor is configured to drive the positioning chip to continue scanning until the positioning chip completes the scan.

14. The mobile apparatus according to claim 12, wherein the apparatus information comprises at least one of an apparatus name, an Internet Protocol (IP) address, a service set identifier, and a network setting, wherein the network setting is used to indicate that one of the single or the plurality of display apparatuses transmitting one of the at least one response signal is in an access point (AP) mode or a station mode, the positioning information comprises one of the corresponding distances between each of the display apparatus and the mobile apparatus and one of the corresponding signal emission angles corresponding to the each of the display apparatus with the mobile apparatus.

15. The mobile apparatus according to claim 14 further comprising a storage, wherein in response to the positioning chip receiving the at least one response signal from the single or the plurality of display apparatuses, the processor is configured to:

if the storage has not stored the apparatus name of any one of the single or the plurality of display apparatuses, add the apparatus information and the positioning information corresponding to the apparatus name; and if the storage has stored the apparatus name, overwrite the apparatus information and the positioning information corresponding to the apparatus name.

16. The mobile apparatus according to claim 11, wherein the processor is configured to:

in response to the display apparatuses being scanned, obtain a minimum distance from the corresponding distances between the display apparatuses and the mobile apparatus;

in response to the minimum distance corresponding to the plurality of the display apparatuses, among the plurality of signal emission angles corresponding to the display apparatuses corresponding to the minimum distance, select one of the display apparatuses corresponding to the signal emission angle closest to an initial angle as the selected device; and in response to the minimum distance corresponding to one of the display apparatuses, take the one of the display apparatuses corresponding to the minimum distance as the selected display apparatus.

17. The mobile apparatus according to claim 16, wherein the processor is configured to:

in response to the plurality of signal emission angles closest to the initial angle being more than one, among the display apparatuses corresponding to the plurality of signal emission angles closest to the initial angle, take one of the display apparatuses scanned earlier in time order as the selected display apparatus.

18. The mobile apparatus according to claim 11, wherein the positioning chip is an Ultra-wideband wireless communication chip, a Bluetooth Low Energy wireless communication chip, or a sound location chip.

19. The mobile apparatus according to claim 11, wherein the processor is configured to:

in response to a change in the distance between the selected display apparatus and the mobile apparatus, drive the positioning chip to scan from 0 to 360 degrees about the positioning chip respectively to select another selected display apparatus.

20. The mobile apparatus according to claim 11, wherein the processor is further configured to transfer a personal data of the mobile apparatus to the selected display apparatus, such that the selected display apparatus is configured to obtain the personal data corresponding to a user.

\* \* \* \* \*